US008543869B2

(12) United States Patent
Gao et al.

(10) Patent No.: US 8,543,869 B2
(45) Date of Patent: Sep. 24, 2013

(54) METHOD AND SYSTEM FOR RECONSTRUCTING ERROR RESPONSE MESSAGES UNDER WEB APPLICATION ENVIRONMENT

(75) Inventors: Bo Gao, Beijing (CN); Chang Jie Guo, Beijing (CN); Lin Luo, Beijing (CN); Shun Xiang Yang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 12/769,845

(22) Filed: Apr. 29, 2010

(65) Prior Publication Data

US 2010/0281311 A1 Nov. 4, 2010

(30) Foreign Application Priority Data

Apr. 30, 2009 (CN) .......................... 2009 1 0136965

(51) Int. Cl.
*G06F 11/00* (2006.01)
(52) U.S. Cl.
USPC .................................. 714/48; 714/2; 714/57
(58) Field of Classification Search
USPC .................. 714/1, 48, 2, 57; 726/11
See application file for complete search history.

(56) References Cited

U.S. PATENT DOCUMENTS

| 6,308,205 | B1 * | 10/2001 | Carcerano et al. ............ 709/221 |
| 6,484,150 | B1 * | 11/2002 | Blinn et al. ................ 705/26.81 |
| 6,542,933 | B1 * | 4/2003 | Durst et al. ................... 709/229 |
| 6,775,687 | B1 * | 8/2004 | Binding et al. ............... 709/203 |
| 6,804,783 | B1 | 10/2004 | Wesinger, Jr. et al. |
| 7,941,478 | B2 * | 5/2011 | Calo et al. ..................... 709/201 |
| 8,126,868 | B1 * | 2/2012 | Vincent ........................ 707/708 |
| 2002/0083343 | A1 * | 6/2002 | Crosbie et al. ............... 713/201 |
| 2002/0095459 | A1 * | 7/2002 | Laux et al. .................... 709/203 |
| 2002/0184179 | A1 * | 12/2002 | Siegel et al. ..................... 707/1 |
| 2003/0140140 | A1 * | 7/2003 | Lahtinen ....................... 709/224 |
| 2004/0064824 | A1 * | 4/2004 | McNeely et al. ............. 719/316 |
| 2005/0028010 | A1 * | 2/2005 | Wallman ....................... 713/201 |
| 2005/0071421 | A1 * | 3/2005 | Calo et al. ..................... 709/203 |
| 2005/0183092 | A1 * | 8/2005 | Christensen et al. ......... 719/313 |
| 2006/0020884 | A1 * | 1/2006 | Graham ........................ 715/517 |
| 2006/0104202 | A1 * | 5/2006 | Reiner ........................... 370/230 |

(Continued)

FOREIGN PATENT DOCUMENTS

WO WO-2007098960 A1 9/2007

OTHER PUBLICATIONS

WAFEC, Web Application Firewall Evaluation Criteria, http://www.webappsec.org/projects/wafec/.

*Primary Examiner* — Loan L. T. Truong
(74) *Attorney, Agent, or Firm* — Scully, Scott, Murphy & Presser, P.C.; Preston J. Young, Esq.

(57) ABSTRACT

A computer-implemented method and system for reconstructing a response message to an improper accessing request in a web application environment. The method includes: obtaining the URL of a web application to be accessed by the improper accessing request and the error parameter information of the improper accessing request; obtaining a response template based on the obtained URL of the web application to be accessed; and merging the obtained error parameter information of the improper accessing request with the obtained response template to generate a reconstructed response message for the improper accessing request. The system includes: a message obtaining device; a response message template obtaining device; and a response message merging device.

16 Claims, 5 Drawing Sheets

(56) References Cited

U.S. PATENT DOCUMENTS

| | | | |
|---|---|---|---|
| 2007/0107041 A1* | 5/2007 | Kayashima et al. | 726/1 |
| 2007/0136255 A1* | 6/2007 | Rizzo et al. | 707/3 |
| 2007/0199050 A1 | 8/2007 | Meier | |
| 2007/0204015 A1* | 8/2007 | Gonzalez Lopez et al. | 709/223 |
| 2007/0283273 A1* | 12/2007 | Woods | 715/738 |
| 2008/0005127 A1* | 1/2008 | Schneider | 707/10 |
| 2008/0034367 A1* | 2/2008 | Patrick et al. | 718/101 |
| 2008/0140786 A1* | 6/2008 | Tran | 709/206 |
| 2008/0177588 A1* | 7/2008 | Abbott et al. | 705/7 |
| 2008/0235344 A1* | 9/2008 | Paul | 709/206 |
| 2008/0263650 A1* | 10/2008 | Kerschbaum | 726/9 |
| 2008/0294479 A1* | 11/2008 | Emling et al. | 705/7 |
| 2008/0320567 A1* | 12/2008 | Shulman et al. | 726/4 |
| 2009/0044271 A1* | 2/2009 | Benameur et al. | 726/22 |
| 2009/0064337 A1* | 3/2009 | Chien | 726/25 |
| 2009/0137259 A1* | 5/2009 | Li | 455/466 |
| 2009/0150771 A1* | 6/2009 | Buck et al. | 715/273 |
| 2009/0193497 A1* | 7/2009 | Kikuchi et al. | 726/1 |
| 2009/0252159 A1* | 10/2009 | Lawson et al. | 370/352 |
| 2009/0328187 A1* | 12/2009 | Meisel | 726/13 |
| 2010/0106541 A1* | 4/2010 | Upadhyaya et al. | 705/7 |
| 2010/0199170 A1* | 8/2010 | Hoffman | 715/234 |
| 2010/0313073 A1* | 12/2010 | Leeb et al. | 714/37 |

* cited by examiner

METHOD AND SYSTEM FOR RECONSTRUCTING ERROR RESPONSE MESSAGES UNDER WEB APPLICATION ENVIRONMENT

CROSS-REFERENCE TO RELATED APPLICATIONS

This application claims priority under 35 U.S.C. §119 to Chinese Patent Application No. 200910136965.2 filed Apr. 30, 2009, the entire contents of which are incorporated by reference herein.

BACKGROUND OF THE INVENTION

1. Field of the Invention

The present invention relates to the field of accessing web applications, and more particularly, to a method and a system for reconstructing a response message when a violation is detected in a server-side Web Application Firewall (WAF).

2. Description of the Related Art

With the rapid development of web applications, requirements for WAFs are increasing. Compared with the traditional firewall, the WAF can fend off the attack to server-side web applications caused by malicious HTTP accessing requests (generally called error HTTP access requests). However, a False Positive is an inherent problem of the WAF and it is difficult to solve. Under many circumstances, if a user submits a HTTP request to a server-side web application and the submitted HTTP request is confirmed to be a malicious request by the WAF, the WAF will return an error message to the user instead of transmitting the HTTP request to the server-side web application. As a result, the user's experience is seriously affected because the submitted HTTP requests can be considered malicious requests due to, for example, incorrectly inputted "sensitive characters" by users.

A first existing solution to the above problem is to reconstruct the response web pages provided by the WAF when malicious HTTP requests are detected by the WAF by modifying the source code of the HTTP Server Container. One disadvantage of this solution is that it is a requirement to modify the source code of the HTTP Server Container, that is, based on comprehensive analysis and tests to the source code of the HTTP Server Container, which is not easy to do. The HTTP server container is a universal component in the web application environment and the core component of the HTTP server. The main roles of the HTTP server container are fending off HTTP requests and HTTP responses, recording the requests and responses and transmitting such requests and responses. Therefore, the function of the HTTP server container in detecting whether HTTP requests are malicious is not perfect.

A second existing solution involves transmitting the malicious HTTP requests (confirmed by the WAF) directly to server-side web applications instead of generating an error status code even if the malicious HTTP requests are detected by the WAF, then server-side web applications reconstruct the HTTP responses to return to users. There are two main disadvantages of this solution: one is that transmitting malicious HTTP requests to server-side applications can cause an actual attack (if they are real malicious HTTP requests); the other is that this solution requires the modification of the source code of server-side web applications with high cost and is difficult to accomplish.

A third existing solution (shown in FIG. 1) involves customizing more friendly static error response messages in the HTTP server to replace the error response messages incorporated in the HTTP server. The HTTP server can be understood as the HTTP server container plus various function modules developed by users based on the HTTP server container. Therefore, unlike the first solution above, this solution does not require modification of the source code of the HTTP server container. Instead, this solution enables the customization of several static error response pages according to different error status codes respectively. The code below is inserted into the source code of the HTTP server container at the same time (for example):

ErrorDocument 500/customize500.html
    # ErrorDocument 403/customize403.html The meaning of the above HTTP configuration code (HTTPd) is: if the error status code is 500, return the customized page of customize500.html to the user, and if the error status code is 403, return the customized page of customize403.html to the user. One of the disadvantages is that only static error pages can be returned for malicious HTTP requests, so there is less flexibility. Furthermore, based on the characteristics of the HTTP server, under the Java Script (JS) environment of the end user, the customized static error pages that are returned normally may not be listed if only the content of error pages is modified other than the error status code of HTTP responses, which could result in an error.

FIG. 1 shows the block diagram of system for reconstructing error response messages under the web application environment with an existing WAF. The system is referred to number 100 generally in FIG. 1. Blocks 101-104 within the real line block represent necessary components of the traditional web application accessing system, without a function for reconstructing error response messages. The existing system 100 enables the return of more friendly static error pages to the HTTP requests submitted by users that are deemed to be malicious in the case of a web application environment with a WAF. The system 100 includes a client module 101, a WAF module 102, an HTTP server module 103, a web application module 104 and a static error response configuration module 105.

The client module 101 submits the HTTP requests for accessing web applications to the HTTP server module 103. The HTTP server module 103 transmits the received HTTP requests to the WAF module 102 so that the WAF module 102 can analyze the HTTP requests. If the HTTP requests are normal HTTP requests, a successful status code 200 will be sent to the HTTP server module 103 and then the HTTP server module 103 transmits the normal HTTP requests to the web application module 104 so that the client 101 is able to access the web application module 104. If the HTTP requests are malicious requests, the WAF module 102 will send an analyzed error status code (such as status 500 representing "internal error of HTTP server") of the malicious requests to the HTTP server module 103. Next, the HTTP server module 103 will invoke the static error response pages stored in the static error response configuration module 105 as a response to the malicious HTTP requests submitted by the client 101, which will be returned to the client 101 via the HTTP server module 103. The error status codes are coded by the WAF module 102 to identify the error status of the malicious HTTP requests.

Besides the error status codes, the WAF module 102 can also identify the successful status codes, such as the status code 200 described above. The HTTP server module 103 can take on different operations according to the status codes analyzed and sent by the WAF module 102. Error status codes and successful status codes are generally called status codes. Normal error status codes include: 400, error requests; 405, forbidden ways of requests; 403, forbidden access; 404, requested pages are not found; 500, internal error of HTTP server.

SUMMARY OF THE INVENTION

Considering above identified problems, the present invention provides a computer-implemented apparatus and method for reconstructing error response messages for the web application environment in order to return new response messages to users who submit HTTP requests deemed to be malicious by customizing response-message templates and utilizing the customized templates to trigger a response message reconstruction module in down stream, without the need to modify the codes of the HTTP server container and the server-side web applications. Thus, user's experience is improved with less cost.

According to the first aspect of the present invention, a computer-implemented method is provided for reconstructing a response message to an improper accessing request in a web application environment. The method includes: obtaining the URL of a web application to be accessed by the improper accessing request and the error parameter information of the improper accessing request; obtaining a response template based on the obtained URL of a web application to be accessed; and merging the obtained error parameter information of the improper accessing request with the obtained response template to generate a re-constructed response message for the improper accessing request.

According to the second aspect of the present invention, a computer-implemented system is provided for reconstructing a response message to an improper accessing request in a web application environment. The system includes: a message obtaining device for receiving the response message, and if the received response message corresponds to the improper accessing request, then obtain the URL of a web application to be accessed by the improper accessing request and the error parameter information of the improper accessing request; a response message template obtaining device for obtaining a response template based on the obtained URL of the web application to be accessed; and a response message merging device for merging the obtained error parameter information of the improper accessing request with the obtained response template to generate a re-constructed response message for the improper accessing request.

BRIEF DESCRIPTION OF THE DRAWINGS

Below is the detailed illustration of preferred embodiments in conjunction with the drawings, in which.

DETAILED DESCRIPTION OF PREFERRED EMBODIMENTS

The present invention will be described with reference to above figures.

Figure 2:
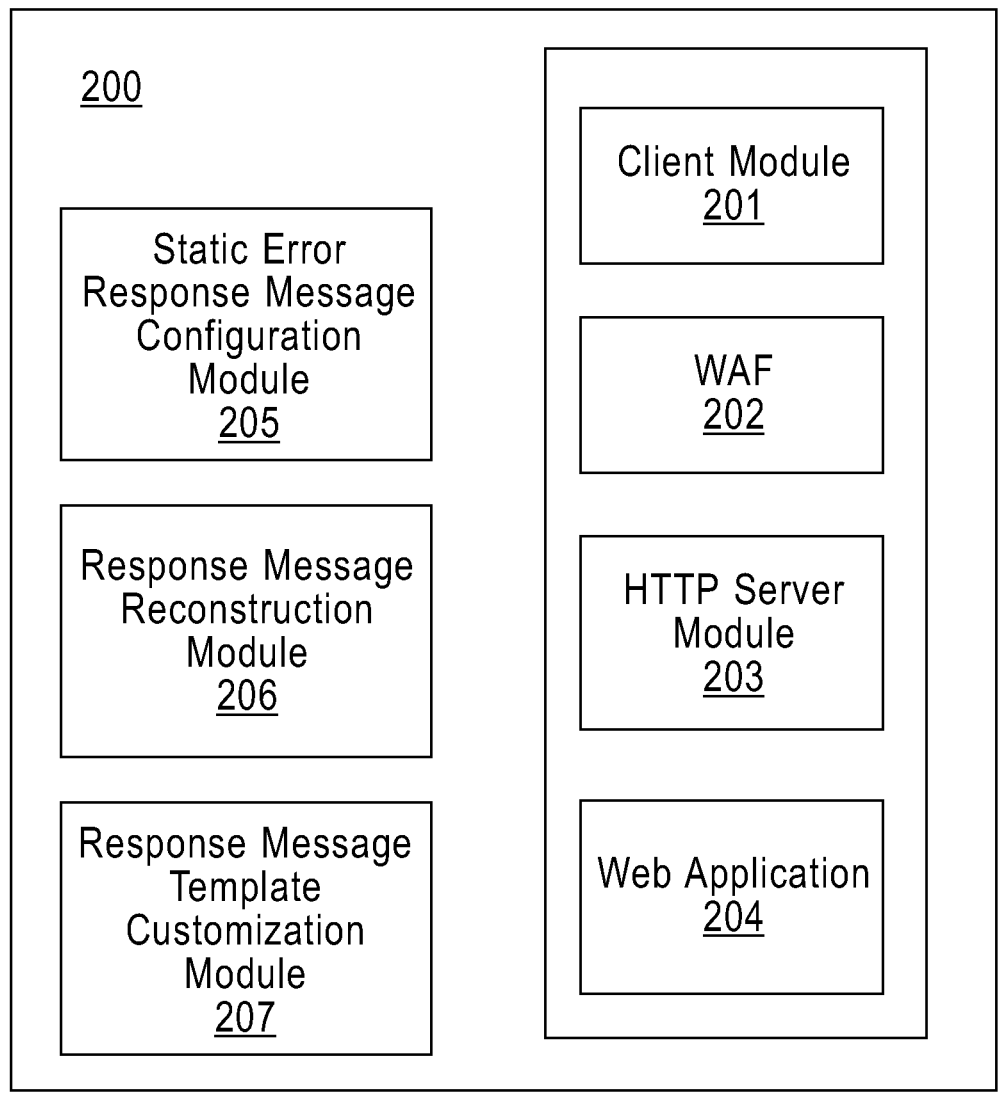
FIG. 2 is a block diagram of a web application accessing system that reconstructs error response messages according to embodiments of the present invention.

Referring to FIG. 2, a block diagram shows a web application accessing system that reconstructs error response messages according to embodiments of the present invention. The system is referred to 200 in FIG. 2 in general. The system 200 enables the reconstruction of response messages to be returned according to the HTTP requests submitted by users and deemed to be malicious by the WAF under the web application environment with the WAF. Generally, the response messages exist and are returned to client in the form of pages. The system 200 includes a client module 201, a WAF module 202, an HTTP server module 203, a web application module 204, a static error response message configuration module 205, a response message reconstructing module 206 and a response message templates customizing module 207.

Figure 1:
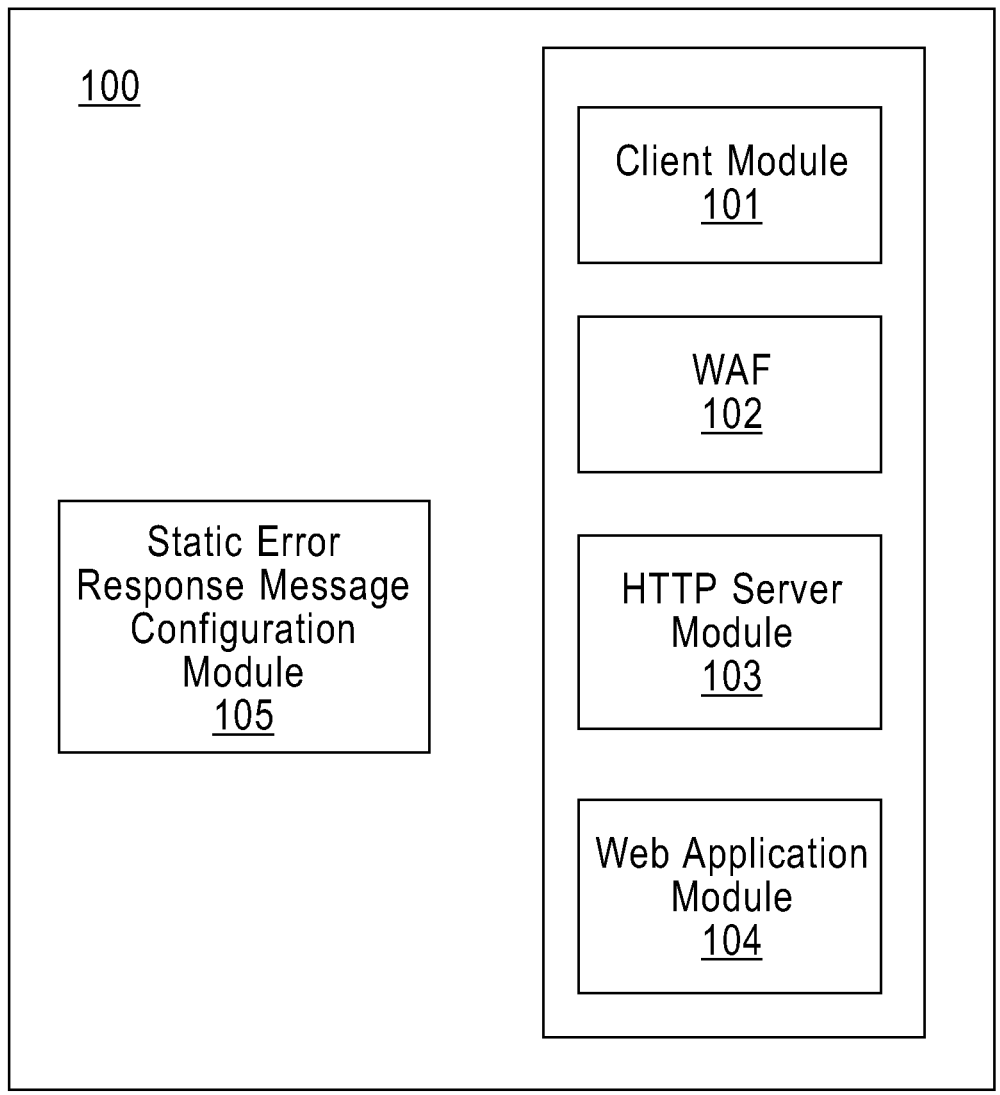
FIG. 1 is a block diagram of an existing system under a web application environment with a WAF for providing friendly HTTP response messages to users by customizing static response pages.

In comparison with FIG. 1 (prior art), a response message reconstructing module 206 and a response message templates customizing module 207 are added into the system 200 shown in FIG. 2, and the function of the static error response message configuration module 205 in FIG. 2 is different from the function of the static error response message configuration module 105 in FIG. 1. However, in terms of function and implementation, the web environment, elementary infrastructure, client module 201, WAF module 202, HTTP server module 203 and web application module 204 are similar to the corresponding modules in the system 100 shown in FIG. 1. Particularly, the client module 201 submits HTTP requests for accessing the web application module 204 to the HTTP server module 203. The HTTP server module 203 transmits the received HTTP request to the WAF module 202, so that the WAF module 202 analyzes the HTTP request. If the HTTP request is a normal HTTP request, it is transmitted to the web application module 204 to allow for the client 201 to access the web application module 204. If the HTTP request is a malicious request, the WAF module 202 will transmit the analyzed error status code of the malicious HTTP request to the HTTP server module 203 that will invoke the static error response message stored in the static error response message configuration module 205 to trigger the response message reconstructing module 206 on the down stream.

The reason for invoking static error pages stored in the static error response message configuration module 205 before triggering the response message reconstructing module 206 other than directly utilizing the default error response messages of HTTP server module 203 is that the latter is down stream which is returned to the client module 201 directly from the HTTP server module 203 but not up stream which is able to trigger the response message reconstructing module 206. The so called down stream refers to the route back to client module 201, which is different from the up stream referring to the route by which client module 201 submits HTTP request for accessing web application module 204 to HTTP server module 203.

The static error response messages stored in the static error response message configuration module 205 include a predefined special characters string for the response message reconstructing module 206 to identify. There is no more limitation to the content of the special characters string except that the special characters string can be differentiated from some universal strings. The reason for doing this is that sometimes it is only necessary to reconstruct the error response messages corresponding to specific error status codes other than all error status codes. Thus, by adding special strings for identification in the static error response messages corresponding to specific error status codes that need to be reconstructed, the response message reconstructing module 206 continues to follow the operations of reconstructing response messages after identifying these special strings. Persons skilled in this art should understand that identifying the special strings is not an essential function or essential operation of the response message reconstructing module 206, and adding this kind of special strings in static error response messages is not an essential operation.

Since the response message reconstructing module 206 reconstructs response messages returned to the client module 201 according to the response message templates and error parameters (which will be described below), the static error response messages need not to be overly complex. Since the static error response messages stored in the static error response message configuration module 205 have not been reconstructed, those static error response messages could be deemed as a kind of original response messages. Besides the above static error response messages, the original response messages can also include normal response messages returned to the client module 201 by the web application module 204.

After the response message reconstructing module 206 is triggered, the response message template is obtained according to the Uniform Resource Locator (URL) information of the HTTP request submitted by the client 201 for accessing the web application module 204 (that is, the network address of the web application module 204 to be accessed by the client module 201), where the response message template is customized by the response message template customization module 207. The error parameters of the HTTP request, which is submitted by the client module 201 and confirmed to be malicious by the WAF module 202, will be merged with the obtained response message template (marking the error parameters at the corresponding location in the response message template). The error parameters of the HTTP request refer to a field that includes a malicious attacking string confirmed by the WAF of the HTTP request submitted by the client module 201. In other words, the information about which field in the HTTP request is erroneous is added to the corresponding location in the response message template so that the client module 201 can detect the reason for the WAF confirming the HTTP request as a malicious HTTP request while obtaining friendly error response messages. Since the WAF module 202 will add information about error parameters to the original HTTP request when confirming that the HTTP request submitted by the user is a malicious HTTP request, the response message reconstructing module 206 in the down stream could obtain these error messages after being triggered based on the character of the HTTP server.

Besides merging the error parameters of the HTTP request with the response message template, the error status code of the HTTP request submitted by the client module 201 may require modification. Accordingly, the reconstructed response message will be sent to the client module 201 so that the client module 201 can receive a friendly error response page. The reason for modifying the error status code of the HTTP request submitted by the client module 201 is that in the event that the client is under the Java Script environment, if the error status code of the HTTP request is not modified and only the content of the error response message is modified, the logic code of the client JS will not show the error response message normally—for example, if an AJAX request is sent out by JavaScript, the response content will be handled by the specified JS call back function defined in the JS logic. In situations where embodiments of the present invention are applied to a client under a non-JS environment, modifying the error status code is not an essential operation of the response message reconstructing module 206.

Furthermore, a manual customization or "self-learning" mechanism can be utilized by the WAF to customize the response message templates. In addition, any other public known technical methods in this art can be adopted to customize the response message template as long as the URL of the web application module 204 to be accessed by the client module 201 corresponds to the response message template.

In one embodiment of the present invention, the corresponding relationship between the URL and the response message template can be a "one to one correspondence" (i.e., one URL corresponds to one response message template), a "one to more correspondence" (i.e., one URL corresponds to more than one response message templates) to get a more corresponding relationship, or a "more to one correspondence" (i.e., more than one URLs correspond to one response message template) to get a more corresponding relationship. Solutions for different correspondence relationships will be describe with reference to FIG. 3.

The response message reconstructing module 206 and response message template customization module 207 outside the real line block in FIG. 2 are newly added modules in the solutions of the embodiments of the present invention. Although the static error response message configuration module 205, which is also outside the real line block in FIG. 2, exists in prior arts (see module 105 in FIG. 1), the functions and implementation methods of the static error response message configuration module 205 in FIG. 2 and the static error response message configuration module 105 in FIG. 1 (prior art) are not the same.

It can be seen from FIG. 2 and the corresponding description that, it is possible to return more friendly error response messages to the client based on the customized correspondence between the URL to be accessed by the client and the response message template through the system 200 shown in FIG. 2, without modifying the codes of the HTTP server and back end web applications, where the client under the Java Script environment could be supported by modifying the error status codes of the HTTP requests thus improving a user's experience.

Figure 3:
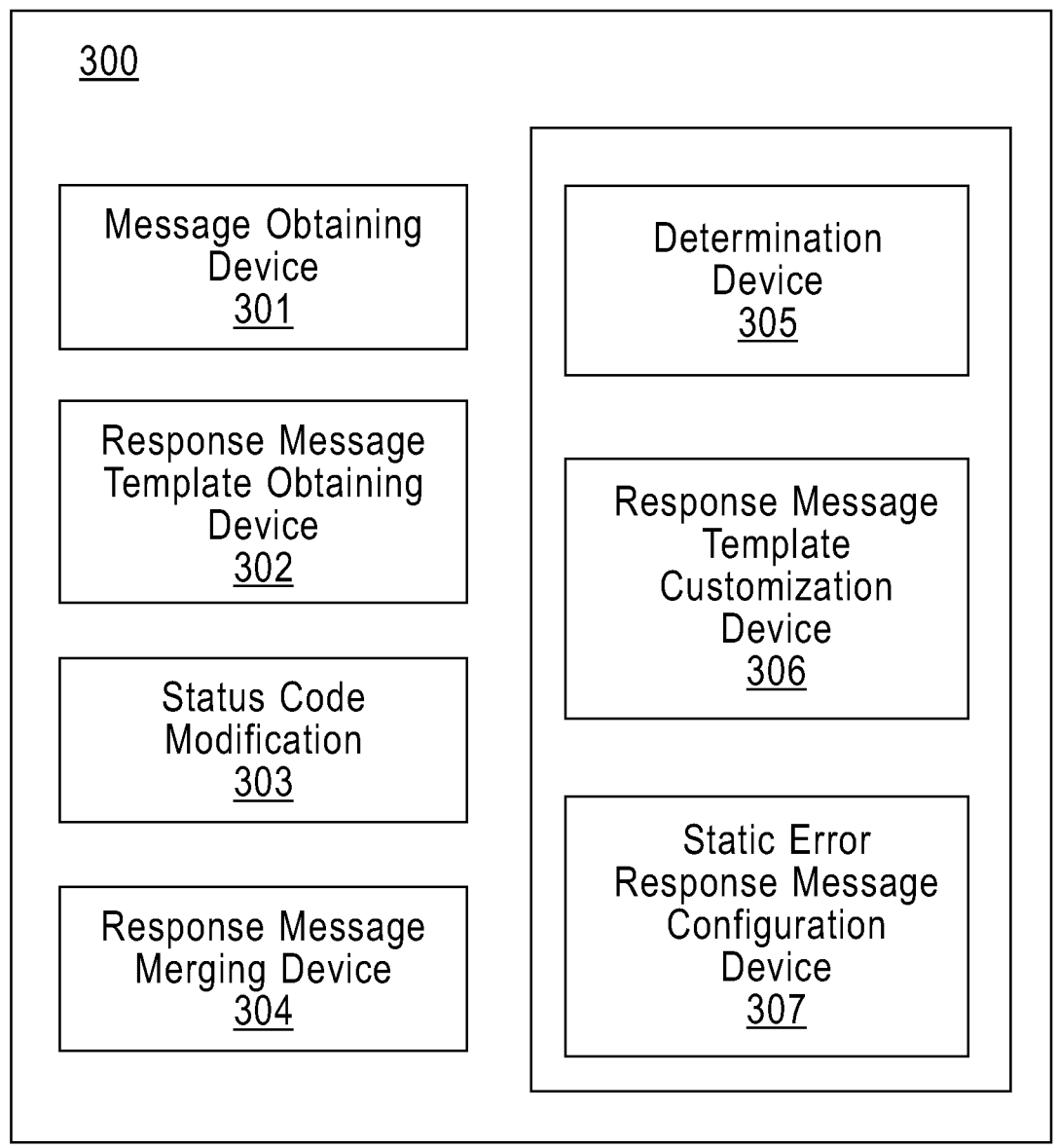
FIG. 3 is a block diagram of an apparatus for reconstructing response messages to improper accessing requests under a web application environment according to embodiments of the present invention.

FIG. 3 shows the structure of an apparatus for reconstructing error response messages under a web application environment with a WAF. The apparatus for reconstructing error response messages is referred to 300 in general in FIG. 3. The apparatus 300 includes a message obtaining device 301, a response message template obtaining device 302, a response message merging device 303, a status code modifying device 304, a determination device 305, a response message template customizing device 306 and a static error response message configuration device 307, where the status code modifying device 304, the determination device 305, the response message template customizing device 306 and the static error response message configuration device 307 are in broken line block. This means that the four devices are not necessary components of the apparatus 300. The apparatus 300 shown in FIG. 3 can be deemed as a summation of the static error response message configuration module 205, the response message reconstructing module 206 and the response message templates customizing module 207 shown in FIG. 2. Furthermore, the response message reconstructing module 206 shown in FIG. 2 could be deemed as summation of five devices shown in FIG. 3: the message obtaining device 301, the response message template obtaining device 302, the response message merging device 303, the status code modifying device 304 and the determination device 305.

The message obtaining device 301 receives a response message, and if the response message received by the message obtaining device 301 is a response message for an error access request, the message obtaining device 301 obtains the URL of the web application to be accessed by the error access request and the error parameter information of the error request. In most runtime cases, the response message received by the message obtaining device 301 can be either a response message for the error access request or a normal response message from a back end web application. However, where the back end web application is shielded (that is, there is an artificial assurance that each response message is for the error access request), the message obtaining device 301 can only receive a response message for the error access request.

The response message template obtaining device 302 obtains the response message template corresponding to the URL, which is obtained by the message obtaining device 301 and will be accessed by the error HTTP request. The response message template is customized by the response message template customizing device 306. The response message template customizing device 306 customizes the response message template by customizing the correspondence relationship between the URL of the web application and the response message template. Similar to the description of FIG. 2, the correspondence relationship between URL and response message template could be "one to one correspondence", "one to more correspondence" and "more to one correspondence". The following is an example of a "one to more correspondence", which is a mapping from one URL to more than one response message templates based on the different error fields in different HTTP requests accessing the same URL:

```
ALLOWRULE "URI /WAFTest/testresult.html ; email
^[\w-]+(?:\.[\w-]+)*@(?:[\w-]+\.)+[a-zA-Z]{2,7}$"
"ID=060001,ATTACKTYPE=MALFORMED,RESMSG=response_message/resTmp1.txt"
RISKRULE "URI /WAFTest/testresult.html ; address <>='$\'"\;!--"
"ID=060002,ATTACKTYPE=RISKCHARACTER,
RESMSG=response_message/resTmp2.txt"
```

The meanings of above two paragraphs of codes are as follows: for the HTTP request accessing the URL of testresult.html, if the email field (parameter) is erroneous, the text of resTemp1.txt will be obtained correspondingly as template content; if the address field (parameter) is erroneous, the text of resTemp2.txt will be obtained correspondingly as template content. Thus, a "one to more" correspondence relationship between the URL and the response message templates can be achieved so as to differentiate the response message templates. Through above examples, persons skilled in this art should easily understand the "one to one correspondence" and the "more to one correspondence" between the URL and the response message templates.

Realization modes are not limited to software codes in the above examples. Any hardware or software code in other languages can be utilized as long as the correspondence relationship between the URL and the response message templates can be established.

In the above example, "ALLOWRULE" refers to character types that may be included in the email field, that is, a list of permitted character modes. "RISKRULE" refers to character types that cannot be included in the email field, that is, a list of forbidden character modes. Persons skilled in this art can use either method of positive regular expression or negative regular expression to define the rules of transferring the templates.

Many technological methods can be leveraged to define response message templates. Two examples of defining response message templates by using HTML tags and Java Script messages will be shown below. An advantage of defining response message templates by using HTML tags is that many page display elements (such as figs) can be added:

```
<html xmlns="HTTP://www.w3.org/1999/xhtml">
<head>
<title>"ContactHouse" - Contacts </title>
<link rel="shortcut icon" href="/Contacts/css/images/ContactHouse.ico" >
<meta HTTP-equiv="Content-Type" content="text/html; charset=utf-8" />
</head>
<body>
<script language="javascript">
document.write("<div id='flashMessage' class='message'>
<font color=red><b>Valid Parameter <%waflastmatch%> Required.your
request is blocked</b></font></div>");
document.cookie = "flash=;expires=" + new Date( ).toGMTString( ) +
";path=/";
</script>
</body>
</html>
```

The above codes is an example of defining response message templates by using HTML tags, where the bolded code is information about the error parameter of the HTTP request that is added into the response message template. This demonstrates that the necessary parameter "waflastmatch" is not included in the HTTP request.

An example of defining response message templates by using Java Script messages is as follows: {Response:Success; Message: Valid Parameter <% waflastmatch %> Required}.

In this example, "Response:Success" means successfully returning a response message to a client other than the HTTP request submitted by a client successfully accessing the server-side web application. Persons skilled in this art should understand that methods of defining response message templates are not limited to the above two examples. Other methods can be utilized by the response message template customization device 306 to define response message templates. Since response message templates are normally customized before runtime of web applications, any method can be utilized as long as the response message obtaining device 302 can obtain response message templates during the runtime of the apparatus 300. In other words, the apparatus 300 does not necessarily include a response message template customization device 306, so the device 306 is in broken line block in FIG. 3.

The status code modification apparatus 304 modifies the error status code of the HTTP requests that are determined to be malicious. The reason for making this modification is that, if only the content of the error page other than error status code of HTTP request is modified, the client under the JS environment will not display the error response page normally thus resulting in an error. Persons skilled in this art can understand that if the client is not under the JS environment, the status code modification device 304 is not a necessary component of the response message reconstruction apparatus 300 shown in FIG. 3. As such, the status code modification device 304 is also in broken line block in FIG. 3. Examples of modifying status codes could be modifying error status code 500 (internal error of HTTP server) to status code 200 (successful status code), or modifying error status code 403 (forbidden access) to status code 200 (successful status code). Modifying error status codes 500 and 403 to 200 are only examples; the essential purpose is to modify the error status codes corresponding to the unfriendly response messages to status codes corresponding to the friendly response messages, and thus not limited to the use of status code 200.

The response message merging device 303 merges the response message templates obtained by the response message template obtaining device 302 with the error parameter (field) message of the error HTTP requests analyzed by the WAF, to generate error response messages to be returned to the client as a response to the client who submits malicious HTTP requests. The reconstructed response messages include information of the erroneous parameter in the HTTP request submitted by the client and is based on friendly status codes (such as status code 200).

The use of the determination device 305 is to determine whether a received response message by the message obtaining device 301 is an error response message corresponding to a malicious HTTP request, and further whether it is necessary to reconstruct such an erroneous response message. This determination is based on the static error response messages customized by the static error response message configuration device 307. The determination device 305 is useful under the following example circumstances: (1) a response message corresponds to either a malicious HTTP request or a normal response message from the web application; (2) no need to reconstruct all error response messages corresponding to all error status codes. For example, for an error response message of status code 403 "403: access forbidden", if the HTTP server automatically redirects the forbidden HTTP request to another URL, there is no need to reconstruct the error response messages corresponding to the error status code 403. As another example, some response messages are from back end web applications other than the error response messages sent by the WAF. Therefore these response messages from server-side web applications will not be reconstructed or normal access to web applications by users will be terminated.

Under the above two circumstances, in order to determine whether it is necessary to reconstruct a response message, the static error response message configuration device 307 needs to customize static error response messages for those error status codes that need reconstructed response messages, and add identification marks such as special strings in the customized static error response messages. Thus, the determination device 305 determines whether it is necessary to reconstruct received response message by determining whether such identification marks are included in the response messages received by the message obtaining device 301. Persons skilled in this art should understand that since all original error response messages corresponding to all error status codes can be reconstructed, and server-side web applications can be manually prevented from returning normal response messages to the client (such as shielding server-side web applications in testing the performance of the WAF), the determination device 305 is not a necessary component of apparatus 300. Without the determination device 305, the function of reconstructing error response messages of the apparatus 300 will not be affected.

For the static error response message configuration device 307, during the runtime of the apparatus 300 and in the case where there is no need for the determination device 305, as long as the response message template obtaining device 302 and the response message merging device 303 in a down stream flow could be triggered, the response message templates and the error parameter (field) information of the HTTP requests analyzed and sent to the HTTP server by the WAF can be utilized to reconstruct error response messages, without the need for the static error response message configuration device 307 to customize static error response messages. Thus, the apparatus 300 does not always have to include the determination device 305 and the static error response message configuration device 307, which are therefore in broken line block in FIG. 3.

It can be seen from FIG. 3 and the corresponding description that, friendly error response messages can be returned to the client based on the customized correspondence relationship between the URL to be accessed by the client and the response message templates, without modifying the codes of the HTTP server and the server-side web applications, where the client under the JS environment can be supported by modifying error status codes of the HTTP requests so as to enhance a user's experience.

Figure 4:
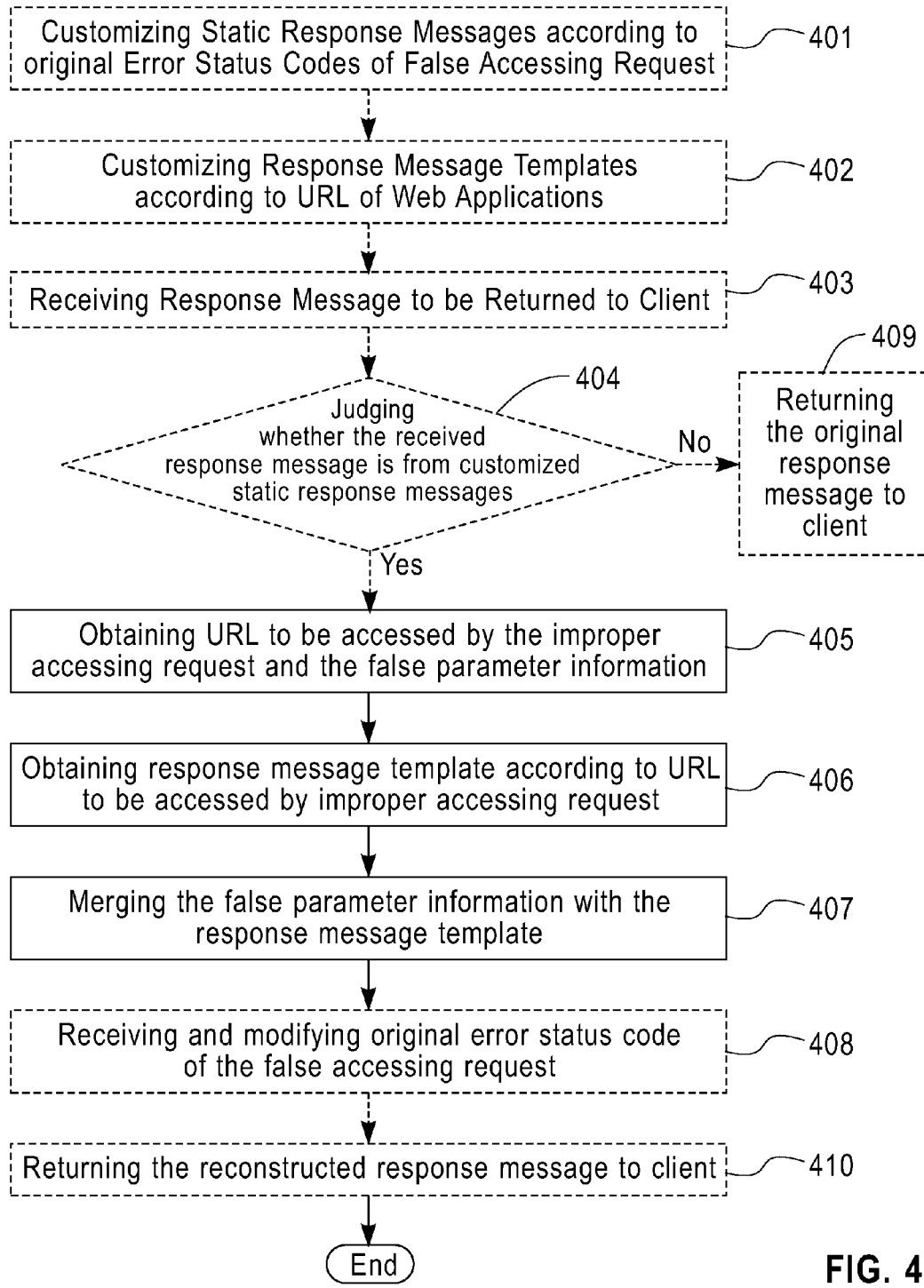
FIG. 4 is a flow chart showing the method for reconstructing response messages to improper accessing requests under a web application environment in accordance with the apparatus shown in FIG. 3.

Corresponding to the apparatus 300 shown in FIG. 3, FIG. 4 shows a flow chart of a method for reconstructing error response messages for malicious HTTP requests under a web application environment. As shown in FIG. 4, steps 401, 402, 404, 408, 409 and 410 are in broken line block, showing that the six steps are not necessary steps in the method shown in FIG. 4. The detail reason will be introduced below.

Reconstructing response messages of HTTP requests submitted by a client under a web application environment with a WAF starts at step 401. In step 401, static error response pages are customized based on the error status codes of the malicious HTTP requests submitted by the client, and the error status codes are fixed and analyzed by the WAF. The reason for customizing the static error response pages is to trigger the steps of reconstructing error response messages in a down stream and take the customized static error response pages as a basis for determining whether there is a need for reconstructing original response messages, with reference to the static response message configuration module (device) in FIG. 2, FIG. 3 and the corresponding descriptions. In the description of FIG. 2, original response messages include pre-defined static error response messages (original error response messages) and normal response messages returned to the client by the web applications. Persons skilled in this art should understand that there are many choices for the storage place of static error response messages, such as the client, remote, any movable storage devices and HTTP server, as long as the customized static error response messages can be read by the WAF.

In addition to customizing static error pages in step 401, it is also possible to customize corresponding response message templates in step 402 based on different URLs of the web applications. The correspondence relationship between the URL and the response message templates can be a "one to one correspondence", which means that one URL corresponds to one response message template; and "one to more correspondence", which means one URL corresponds to more than one response message templates respectively according to different anomaly field (parameters) of the HTTP requests; also there can be a "more to one correspondence", which means more than one URLs correspond to one response message template.

There are various methods for customizing response message templates to be chosen according to different requirements, for example, choosing "one to more correspondence" in a case where response message templates require minor customization. In the above paragraphs, with reference to FIG. 3, an example of customizing response message templates using "one to more correspondence" is described in detail, and examples of two methods to actualize response message templates by HTML tags and JS information are also described. Persons skilled in this art should understand that the methods for customizing response message templates are not limited to HTML tags and Java Script information. Any method for customizing response message templates that is able to return error parameter information to the client can be utilized.

In step 402, the operation of customizing response message templates can be implemented manually or by a "self learning" system. Particularly, manual customization means that manually inputting and storing the response message templates corresponding to the URL of the web applications to be accessed by the HTTP requests submitted by the client, where the response message templates can be stored as text documents or any other readable documents. A "self learning" system means automatically generating response message templates by studying the returned response messages corresponding to these HTTP requests through the shielding function of the WAF of filtering malicious HTTP requests (i.e., transmitting all HTTP requests submitted by client to the corresponding web applications). The "self learning" system has risks because web applications may be attacked if all the HTTP requests submitted by the client are transmitted to corresponding web applications and the HTTP requests are malicious HTTP requests. Persons skilled in this art should understand that different methods for customizing response message templates can be utilized according to different application environments and requirements, for example, the "self learning" system can be utilized to customize response message templates under a test environment in laboratories where the likelihood of a malicious attack is low.

Steps 401 and 402 are to be completed in the phase of initialization. After customizing static error pages and response message templates, the steps of reconstructing error response messages in during the runtime of the WAF will be analyzed hereinafter. A response message to be returned to the client is received in step 403 and the received response message could be either a response message corresponding to an error access request or a normal response message from a server-side web application. However, in the embodiments of the present invention, there is only a need to reconstruct the former, which is a response message corresponding to an error access request. So, it is necessary to determine whether the received response message to be returned to the client is a response message corresponding to an error access request or not in step 404. If yes, go to step 405. If not, go to step 409 in which the received response message will be directly returned to the client. The reason that it could be for determining whether the response message to be returned to client is corresponding to an error access request or not in step 404 is: for an HTTP request submitted by the client to access a web application, the WAF analyzes the request in the traditional way. If the WAF determines the HTTP request to be malicious, the WAF will transmit the analyzed error status code of the malicious HTTP request to the HTTP server so that the HTTP server can transfer a pre-customized static error response message in step 401 according to the error status code.

In step 404, the response message received in step 403 to be returned to the client is analyzed. If the original response message includes the specific string (special identification) defined in the customized static error response messages, it will be indicated that the original response message is the pre-customized static error response message in step 401 which is corresponding to an error access request and needs to be reconstructed, thus step 405 will be operated. If the original response message does not include such a specific string, it will be indicated that the response message received in step 403 is either a normal response message from the server-side web application or a static error response message which does not need to be reconstructed, thus step 409 will be operated in order to directly transmit the received response message to the client. If the response message received in step 403 to be returned to the client is determined in step 404 to correspond to an error access request, the URL address and error parameter information of the error access request will be obtained in step 405. Since the WAF transmits such information to the HTTP server while analyzing the error parameter information of the access requests, the HTTP server will attach such information to the response message to be returned to the client. This is determined by the characteristics of the WAF and the HTTP server without any modification made to the WAF or the HTTP server, which is known technology to persons skilled in this art.

In step 408, the error status code of the error HTTP request is modified, and the error status code is identified and transmitted to the HTTP server by the WAF under the web application environment. For example, the error status code 500 or 403 is modified to status code 200. The purpose of modifying the error status code is to support the client under the JS environment, which has been described in detail in the above paragraphs with reference to FIG. 3.

In step 406, the response message template customized in step 402 is obtained based on the URL of the web application to be accessed by the HTTP request submitted by a user. If the response message template is customized with a "one to more" correspondence relationship in step 402, the customized response message template will be obtained based on the URL and the error parameter information in the HTTP request.

In step 407, the error parameter (field) information in the HTTP request (information about which parameter in the HTTP request is erroneous) is merged with the response message template obtained in step 406, that is, the error parameter information in the HTTP request is added into the corresponding position of the response message template. Thus, besides receiving friendly error response messages, the client can also determine as to which parameter or parameters in the submitted HTTP request is erroneous. Obtaining error parameter information in the HTTP request has been described above. At last, the reconstructed error response message is returned to the client in step 408. Even if step 408 is not operated, reconstructing error response messages can still be completed, and thus step 408 is not a necessary step of the process shown in FIG. 4.

There is no definite time order to operate steps 401 and 402. For example, static error response messages can be customized first, and the response message templates can be customized afterwards, or vice versa. In addition, there is no definite time order for operating step 406 to step 408. For example, the status code can be modified first, and the response message template can be obtained afterwards; or the response message template can be obtained first, then the error information in the HTTP request can be merged with the response message template and finally the status code can be modified. The arrows in FIG. 4 shows an example of one order of operation, but the embodiments of the present invention are not limited to this example.

It can be seen from FIG. 4 and the above description that reconstructed friendly error response messages can be returned to the client based on the customized correspondence relationship between the URL to be accessed by the client and the response message templates as well as the error information of the HTTP requests submitted by the client to access the web applications, without modifying the codes of the HTTP server and the server-side web applications, where the client under the JS environment can be supported by modifying the error status codes of the HTTP requests so as to enhance a user's experience.

For easy comprehension, steps 401 to 410 can be classified as being in the initialization phase or runtime phase. The initialization phase can include step 401 and 402, which is mainly to customize the static error pages and response message templates. The runtime phase can include steps 403 to 410, which refers to the steps of reconstructing the error response messages in the case that the client submits HTTP requests to access the web applications and the WAF performs the functions of heading off and filtering malicious HTTP requests. However, the purpose of this classification is to allow persons skilled in this art to understand the embodiments of the present invention more easily, without any limitation to the present invention. The steps of initialization phase can be operated in runtime phase, for example, administrators can customize new response message templates while the web application accessing system is running; and the steps of runtime phase can also be operated in the initialization phase, for example, response message templates can be obtained before the network of the web application accessing system is put through. Further, as in the above description for FIG. 3, steps in broken line block in FIG. 4 are not necessary steps of the embodiments of the present invention, and they should not be deemed as limitations to the present invention.

Figure 5:
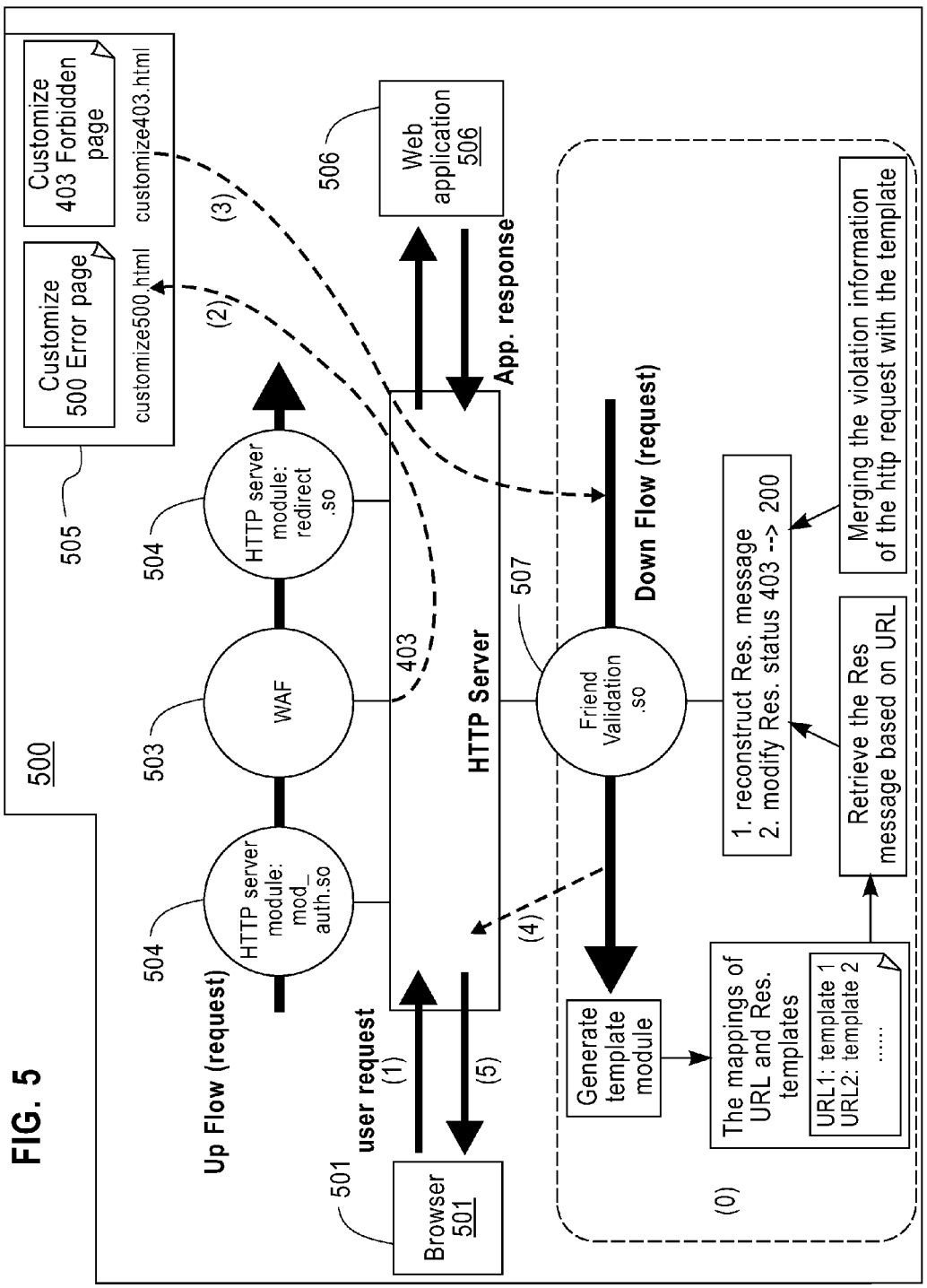
FIG. 5 is a block diagram showing one embodiment in accordance with the apparatus and method of the present invention.

FIG. 5 shows one embodiment in accordance with the apparatus and method of the present invention. Generally, the system shown in FIG. 5 is referred to 500. System 500 includes a browser 501, an HTTP server 502, a WAF 503, an HTTP server additional module 504, a static error response pages group 505, a web application 506 and an error response message reconstruction device 507 (the functions performed by device 507 are also described illustratively.) The above components can be connected via a network connection, such as a token network, Ethernet, WiFi or other network in normal telecommunication standards. The network can be any type of network including Internet, WAN, LAN, VPN and so on. If the browser (client) communicates with the server via the Internet, a connection can be provided via traditional protocols based on TCP/IP sockets, and the client will establish a connection with the server by using internet services.

The browser 501 is one kind of client, and it can be a tool that submits HTTP requests and browsing pages, such as Internet Explorer. Users submit HTTP requests to access the web application 506 via the browser 501. In order to prevent the web application server 506 from being attacked by malicious HTTP requests submitted by users, all such HTTP requests will be first automatically received and analyzed by the WAF 503.

If the WAF 503 determines the received HTTP request to be a normal HTTP request, the HTTP request will be transmitted to the web application 506 via the HTTP server 502. Once the web application 506 receives the request, it returns a response message to the browser 501 via the HTTP server 502, namely "response to request by web application" shown in FIG. 5. This response message is corresponds to the normal response message among the original response messages in the descriptions for FIG. 3 and FIG. 4; and if the WAF 503 determines the received HTTP request to be a malicious HTTP request, then the HTTP request will not be transmitted to the web application 506. In this case, the WAF 503 will head off the HTTP request and transfer corresponding static error response pages such as customize500.html, which corresponds to the static error response messages among the original response messages in the descriptions for FIG. 3 and FIG. 4 above, from the static error response pages group 505 according to the error status code (such as 500) identified by the WAF 503.

Since the static error response page customize500.html is transferred, the error response message reconstruction device 507 on the down stream will be triggered. Because the error response message reconstruction device 507 does not know whether it is triggered by the down stream flow from the web application 506 or by the down stream flow from the static error response pages, the device 507 will need to determine whether the response message as a down stream message is from the static error response pages or not, and whether the response message needs to be reconstructed or not. This determination is performed by adding a specific string for identification in the customized static error response pages in advance.

If the error response message reconstruction device 507 determines that the response message is from the static error response pages and the response message needs to be reconstructed, the following operations shown in FIG. 5 will be performed by device 507: obtaining a pre-customized response message template according to the URL of the web application 506 to be accessed by the malicious HTTP request determined by the WAF 503 (shown in FIG. 5), obtaining the error parameter (error field) information of the malicious HTTP request as well as the error status code 500, modifying the error status code 500 to status code 200, and merging the error parameter (error field) information of the malicious HTTP request with the obtained response message template (inserting the error parameter information to the corresponding position of the response message template to perform the merge). Persons skilled in this art should understand that there is no definite time order for performing the above four operations of the device 507 as long as the response message template is obtained before the merging operation.

To sum up, the error response message reconstruction device 507 is able to reconstruct the original response message of the malicious HTTP request with an error status code 500, and return a new, friendly error response message to the browser 501 in which the error parameter of the HTTP request is highlighted so that the user of the browser 501 can modify the HTTP request. At the same time, the web application 506 is shielded from a possible attack caused by the malicious HTTP request because the functions of the WAF 503 are not affected. In the system 500, there is no modification to the internal program codes of the HTTP server 502 and the web application 506. Instead, reconstructing error response messages can be accomplished by adding the error response message reconstruction device 507 and transferring the pre-customized static error response pages (original error response messages) as a down stream message to trigger the error response message reconstruction device 507 to modify the original error response message.

As will be appreciated by those skilled in the art, aspects of the present invention may be embodied as a system or method (as described above) or as a computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

A combination of one or more computer readable medium (s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or a suitable combination of the foregoing. A computer readable storage medium may be a tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or a suitable combination of the foregoing.

Computer program code for carrying out operations for aspects of the present invention may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The above-described exemplary embodiments are intended to be illustrative in all respects of the method and apparatus for processing local files using remote applications, rather than restrictive, of the present invention. Those skilled in the art should recognize that the present invention is capable of many variations and modifications within the scope and spirit of the present invention. The scope of the present invention is defined only by the appended claims.

What is claimed is:

1. A computer-implemented method for reconstructing a response message to an improper accessing request in a web application environment, the method comprising:
    obtaining the URL of a web application to be accessed by said improper accessing request and the error parameter information of said improper accessing request, wherein said obtaining step is in response to receiving a response message corresponding to said improper accessing request;
    obtaining a response template that is selected from a plurality of possible response templates, wherein the response template that is selected is selected based on said obtained URL of said web application to be accessed; and
    merging said obtained error parameter information of said improper accessing request with said obtained response template to generate a reconstructed response message for said improper accessing request.

2. The method of claim 1, further comprising receiving and modifying an original error status code of said improper accessing request, as a part of said reconstructed response message.

3. The method of claim 1, wherein said response message corresponding to said improper accessing request is a static error response message customized based on an original error status code of said improper accessing request.

4. The method of claim 3, wherein said static error response message has a specific identification.

5. The method of claim 1, further comprising customizing said response template, wherein said response template corresponds to said URL of said web application.

6. The method of claim 5, wherein said correspondence between said response template and said URL of said web application is a one-to-one correspondence, a one-to-more correspondence, or a more-to-one correspondence.

7. A computer-implemented apparatus for reconstructing a response message to an improper accessing request in a web application environment, the apparatus comprising:
- a message obtaining device for receiving said response message, and if said received response message corresponds to said improper accessing request, obtaining the URL of a web application to be accessed by said improper accessing request and the error parameter information of said improper accessing request;
- a response template obtaining device for obtaining a response template that is selected from a plurality of possible response templates, wherein the response template that is selected is selected based on said obtained URL of said web application to be accessed; and
- a response message merging device for merging said obtained error parameter information of said improper accessing request with said obtained response template to generate a reconstructed response message for said improper accessing request.

8. The apparatus of claim 7, further comprising a status code modification device for receiving and modifying an original error status code of said improper accessing request, as a part of said reconstructed response message.

9. The apparatus of claim 7, further comprising a static response message configuration device for customizing a static error response message based on an original error status code of said improper accessing request.

10. The apparatus of claim 9, further comprising a determination device for determining whether said response message received by said message obtaining device is said customized static error response message, and if said response message received by said message obtaining device is said customized static error response message, concluding said response message received by said message obtaining device to correspond to said improper accessing request.

11. The apparatus of claim 10, wherein said determination device is further configured to determine whether said static error response message has a specific identification, and if said static error response message has said specific identification, concluding said response message received by said message obtaining device to correspond to said improper accessing request.

12. The apparatus of claim 7, further comprising a response template customizing device for customizing said response template, wherein said response message template corresponds to said URL of said web application.

13. The apparatus of claim 12, wherein said correspondence between said response template and said URL of said web application is a one-to-one correspondence, a one-to-more correspondence, or a more-to-one correspondence.

14. A non-transitory computer readable storage medium having a computer program product for reconstructing a response message to an improper accessing request in a web application environment, said computer program product comprising computer program instructions for carrying out the steps of:
- obtaining the URL of a web application to be accessed by said improper accessing request and the error parameter information of said improper accessing request, wherein said obtaining step is in response to receiving a response message corresponding to said improper accessing request;
- obtaining a response template that is selected from a plurality of possible response templates, wherein the response template that is selected is selected based on said obtained URL of said web application to be accessed; and
- merging said obtained error parameter information of said improper accessing request with said obtained response template to generate a reconstructed response message for said improper accessing request.

15. The computer readable storage medium according to claim 14, wherein said computer program instructions further carry out the step of receiving and modifying an original error status code of said improper accessing request, as a part of said reconstructed response message.

16. The computer readable storage medium according to claim 14, wherein said computer program instructions further carry out the step of customizing said response template, wherein said response template corresponds to said URL of said web application.

* * * * *